O. F. ENSIGN.
AUTOMATIC LOCKING DEVICE.
APPLICATION FILED FEB. 1, 1918.
1,287,270.
Patented Dec. 10, 1918.
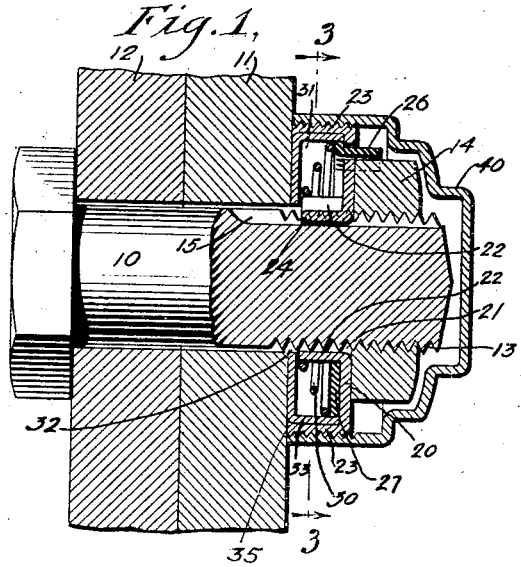
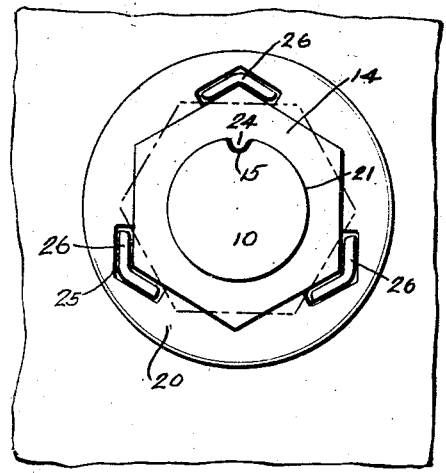
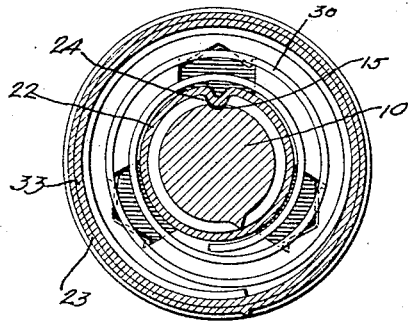
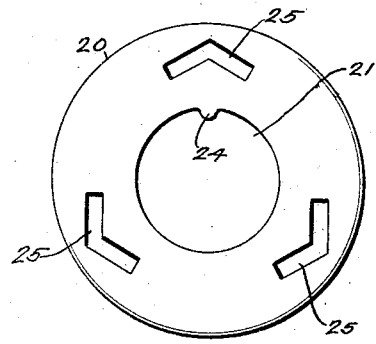
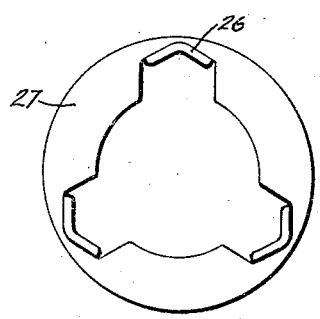
WITNESSES
INVENTOR
Otis Frazer Ensign
BY
ATTORNEYS

UNITED STATES PATENT OFFICE.

OTIS FRAZER ENSIGN, OF DEFIANCE, OHIO.

AUTOMATIC LOCKING DEVICE.

1,287,270.  Specification of Letters Patent.  Patented Dec. 10, 1918.

Application filed February 1, 1918. Serial No. 214,873.

*To all whom it may concern:*

Be it known that I, OTIS FRAZER ENSIGN, a citizen of the United States, and a resident of Defiance, in the county of Defiance and State of Ohio, have invented a new and Improved Automatic Locking Device, of which the following is a full, clear, and exact description.

The invention relates to nut locks, and its object is to provide a new and improved locking device arranged to lock a screwed up nut in place on a bolt to protect the nut and its locking device against rain, snow, dust and other extraneous matter, to allow of locking the nut at the sides or at the corners thereof, and to permit unscrewing of the nut whenever it is desired to do so.

In order to accomplish the desired result, use is made of a washer having a central opening for the passage of a bolt and having a series of apertures grouped around the central opening, and a locking ring yieldingly mounted on the back of the said washer and having approximately V-shaped locking lugs projecting through the said apertures to engage the sides or corners of a nut screwed on the said bolt. Use is also made of a cup-shaped spring seat fitted on the washer and forming a seat for the spring pressing the locking ring. Use is also made of a cap screwing on the rim or outer flange of the washer to protect the parts of the locking device against extraneous matter.

A practical embodiment of the invention is represented in the accompanying drawings forming a part of this specification, in which similar characters of reference indicate corresponding parts in all the views.

Figure 1 is a sectional side elevation of the automatic locking device as applied to a bolt and nut, the bolt engaging parts to be fastened together;

Fig. 2 is a face view of the same with the protecting cap removed;

Fig. 3 is a rear sectional face view of the same on the line 3—3 of Fig. 1;

Fig. 4 is a face view of the washer; and

Fig. 5 is a similar view of the locking ring.

The bolt 10 for fastening the bars 11 and 12 together is provided with a thread 13 on which screws a nut 14, and the said bolt is provided with a longitudinally extending groove 15, as plainly indicated in Figs. 1 and 3. The washer 20 is provided with a central opening 21 through which extends the threaded end 13 of the bolt 10, and the said washer 20 is provided with an inner rearwardly extending flange 22 and a similar outwardly extending flange or rim 23, the flanges 22 and 23 being concentric with the center coinciding with the center of the opening 21. The inner flange 22 is provided with a struck-up key 24 engaging the groove 15 to hold the washer 20 against turning on the bolt 10.

The washer 20 is provided in its face with apertures 25, preferably made V-shape, and through which extend locking lugs 26 made V-shape and having their arms diverging inwardly relative to the central opening 21 of the washer. The locking lugs 26 are struck up on a locking ring 27 held on the back of the washer 20, and the said locking lugs 26 are adapted to fit the corners of the nut 14, as plainly indicated in full lines in Fig. 2, or to engage with their terminals the sides of the nut 14 when the latter is turned into the position indicated in dotted lines in Fig. 2. Thus by the arrangement described it requires but one-twelfth of a turn of a nut 14 to engage the lugs 26 with the corners or the sides of the nut.

The locking ring 27 is pressed forwardly by a coil spring 30 seated on a spring seat 31, preferably in the form of a cup having in its bottom a central opening 32 for the passage of the threaded end 13 of the bolt 10. The rim 33 of the spring seat 31 fits against the inner surface of the flange or rim 23 of the washer thus providing a unitary structure which comprises the washer, the locking ring 27, the spring 30 and the spring seat 31. It will be noticed that in this assembled structure the locking ring 27 is pressed forwardly by the spring 30 and rests against the back of the washer 20 with the locking lugs 26 projecting beyond the face of the washer to engage the corners or sides of the nut 14, as above explained. The spring seat 31 is locked in place in the washer by upsetting the edge of the rim 23 of the washer on the back of the seat as indicated at 35 in Fig. 1.

The rim or flange 23 of the washer 20 is provided with an exterior screw thread on which screws a cap 40 inclosing the nut 14 and the automatic locking device thus protecting the parts against rain, snow, dust or other extraneous matter.

In using the locking device, the washer 20 with the locking ring 27, the spring 30 and the spring seat 31 held in position therein, is placed on the threaded end 13 of the bolt 10 with the key 24 engaging the groove 15. The nut 14 is now screwed up, preferably by the use of a socket wrench pressed inward against the lugs 26 to move the same rearwardly and thus allow screwing up of the nut until the parts are securely fastened together with the seat 31 and the edge of the rim 23 seated against the outer face of the part 11, as plainly indicated in Fig. 1. When the socket wrench is removed the locking lugs 26 are forced outward by the action of the spring 30 and engage either the sides or the corners of the nut 14 to hold the same against accidental unscrewing.

It will be noticed that by the arrangement described but three locking lugs 26 are required for securely locking the nut 14 against accidental unscrewing, and by making the locking lugs V-shaped they are exceedingly strong and durable and are not liable to be sheared off by undue strain exerted in unscrewing the nut.

When it is desired to unscrew the nut the locking lugs 26 are pressed inward by the use of a socket wrench or other tool engaging the nut 14 to permit of unscrewing the latter.

Having thus described my invention, I claim as new and desire to secure by Letters Patent:—

1. An automatic locking device for locking nuts on bolts, comprising a washer having a central opening for the passage of a bolt and having a series of apertures grouped around the said opening, the said washer having an outer flange and an inner flange, a locking ring intermediate the said outer and inner flanges and having locking lugs projecting through the said apertures and adapted to engage a nut screwing on the said bolt, a spring pressing the said ring and a cup-shaped seat fitted in the said outer flange and on which the said spring is seated.

2. An automatic locking device for locking nuts on bolts, comprising a washer having a central opening for the passage of a bolt and having a series of apertures grouped around the said opening, the said washer having an outer flange and an inner flange, a locking ring intermediate the said outer and inner flanges and having locking lugs projecting through said apertures and adapted to engage a nut screwing on the said bolt, a spring pressing the said ring, a cup-shaped seat having a central opening registering with the said central opening of the washer, the said seat having its side wall fitting the inner surface of the outer washer flange, the said spring being seated on the said seat, and means holding the said seat in position in the said washer.

3. An automatic locking device for locking nuts to bolts, comprising a washer having concentric outer and inner flanges and provided with apertures, a cup-shaped spring seat fitting the said outer flange, a locking ring intermediate the said washer and the said seat and having locking lugs extending through the said apertures, and a spring intermediate the said locking ring and the said spring seat.

4. An automatic locking device for locking nuts to bolts, comprising a washer having concentric outer and inner flanges and provided with apertures, a cup-shaped spring seat fitting the said outer flange, a locking ring intermediate the said washer and the said seat and having locking lugs extending through the said apertures, a spring intermediate the said locking ring and the said spring seat, and a cap engaging the outer flange of the said washer.

5. An automatic locking device for locking nuts to bolts, comprising a washer having concentric outer and inner flanges and provided with apertures, a cup-shaped spring seat fitting the said outer flange, a locking ring intermediate the said washer and the said seat and having locking lugs extending through the said apertures, a spring intermediate the said locking ring and the said spring seat, the said outer flange of the washer being provided with a screw thread, and a cap screwing on the said screw thread.

6. An automatic locking device for locking nuts on bolts, comprising a washer having a central opening for the passage of a bolt and having a series of apertures grouped around the central opening, and a locking ring yieldingly mounted on the back of the washer and having approximately V-shaped locking lugs projecting through the said apertures to engage the sides or the corners of a nut screwed on the said bolt.

7. An automatic locking device for locking nuts on bolts, comprising a washer having a central opening for the passage of a bolt and having a series of apertures grouped around the central opening, and a locking ring yieldingly mounted on the back of the washer and having approximately V-shaped locking lugs projecting through the said apertures and having their arms diverging toward the wall of the said central washer opening, the terminal of the arms of each lug being adapted to engage a corresponding side of a nut screwed on the said bolt and the said arms in another position of the nut being adapted to engage the corners of the nut.

OTIS FRAZER ENSIGN.

Attest:
ELLA E. KILLEY,
ARZA A. KILLEY,